United States Patent Office 3,810,932
Patented May 14, 1974

3,810,932
STYRYL DYESTUFFS
Nalin Binduprasad Desai and Ponnusami Jayaraman, Goregaon-Bombay, India, and Visvanathan Ramanathan, Basel, and Klaus Artz, Muttenz, Switzerland, Navnitrai Nagarji Naik, Goregaon-Bombay, India, and Walter Jenny, Basel, Switzerland, assignors to Ciba-Geigy AG, Basel, Switzerland
No Drawing. Continuation-in-part of application Ser. No. 806,291, Mar. 11, 1969, now Patent No. 3,679,657, dated July 25, 1972. This application Dec. 15, 1971, Ser. No. 208,417
Claims priority, application Switzerland, Mar. 18, 1968, 3,958/68
Int. Cl. C07c 121/70
U.S. Cl. 260—465 D    3 Claims

ABSTRACT OF THE DISCLOSURE

Styryl dyestuffs containing at least one group of formula —X—CO—NR—SO$_2$—alkyl, wherein R is hydrogen alkyl or cycloalkyl and X is an oxygen or sulphur atom or a group of formula —NR$_1$—, wherein R$_1$ is a hydrogen alkyl or cycloalkyl. The dyestuff dye polyester fibers in fast shades.

---

This application is a Continuation-in-part of United States Application Ser. No. 806,291, filed Mar. 11, 1969, which issued as United States Patent No. 3,679,657 on July 25, 1972.

The present invention relates to new valuable compounds possessing dyestuff character, which contain at least one group of formula —X—CO—NR—SO$_2$— wherein R is an acyl group or preferably a hydrogen atom or an optionally substituted alkyl, cycloalkyl, aryl or heterocyclic group, and X is an oxygen or sulphur atom or a group of formula —NR$_1$—, wherein R$_1$ is an acyl group or preferably a hydrogen atom or an optionally substituted alkyl, cycloalkyl, aryl or heterocyclic group.

The groups R and R$_1$ can each for example be methyl, ethyl, propyl or benzyl groups.

The invention for example relates to azo dyestuffs, especially monoazo dyestuffs and disazo dyestuffs, anthraquinones, perinones, quinphthalones, styryl dyestuffs and nitro dyestuffs.

Azo dyestuffs

The particularly interesting dyestuffs include the monoazo dyestuffs of formula D—N=N—A—NR$_1$'R$_2$' wherein D is the residue of a diazo component A, is an arylene residue, especially an optionally substituted 1,4-phenylene residue, R$_1$' and R$_2$' are each an optionally substituted alkyl group, with at least one of the residues D, A, R$_1$' and R$_2$' containing a group of formula

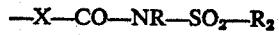

wherein R$_2$ is a monovalent residue, especially an aliphatic a cycloaliphatic, araliphatic, aromatic or heterocyclic residue, such as for example a methyl, ethyl, n-propyl, n-butyl, cyclohexyl, p-tolyl, 2,5-dimethylphenyl, 4-(chloro, fluoro or bromo)phenyl, benzthiazole-2, pyridyl or thienyl-2 residue.

The diazo residue D is mainly derived from monocyclic or bicyclic amines of formula D—NH$_2$ such as any desired diazotizable heterocyclic amines which do not contain any acid substituents conferring solubility in water, but especially from amines which possess a heterocyclic five-membered ring with 2 or 3 hetero-atoms, above all a nitrogen atom and one or two sulphur, oxygen or nitrogen atoms as hetero-atoms, and aminobenzenes, especially those of formula

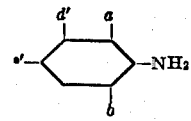

wherein $a$ denotes a hydrogen or halogen atom, or an alkyl or alkoxy, nitro, nitrile, carbalkoxy or alkylsulphone group, $b$ denotes a hydrogen or halogen atom, or an alkyl nitrile or trifluoromethyl group, $c'$ denotes a nitro, nitrile, carbalkoxy, aryl or alkylsulphonyl group and $d'$ denotes a hydrogen atom, a halogen atom, a carboxylic acid ester group or a carboxylic acid amide group.

The following may be mentioned as examples:

2-aminothiazole,
2-amino-5-nitrothiazole,
2-amino-5-methylsulphonylthiazole,
2-amino-5-cyanothiazole,
2-amino-4-methyl-5-nitrothiazole,
2-amino-4-methylthiazole,
2-amino-4-phenylthiazole,
2-amino-4-(4'-chloro)-phenylthiazole,
2-amino-4-(4'-nitro)-phenylthiazole,
3-aminopyridine,
3-aminoquinoline,
3-aminopyrazole,
3-amino-1-phenylpyrazole,
3-aminoindazole,
3-amino-1,2,4-triazole,
5-(methyl, ethyl, phenyl or benzyl)-1,2,4-triazole,
3-amino-1-(4'-methoxyphenyl)-pyrazole,
2-aminobenzthiazole,
2-amino-6-methylbenzthiazole,
2-amino-6-methoxybenzthiazole,
2-amino-6-chlorobenzthiazole,
2-amino-6-cyanobenzthiazole,
2-amino-6-thiocyanatobenzthiazole,
2-amino-6-nitrobenzthiazole,
2-amino-6-carbethoxybenzthiazole,
2-amino-(4- or 6-)methylsulphonylbenzthiazole,
2-amino-1,3,4-thiadiazole,
2-amino-1,3,5-thiadiazole,
2-amino-4-phenyl or 4-methyl-1,3,5-thiadiazole,
2-amino-5-phenyl-1,3,4-thiadiazole,
2-amino-3-nitro-5-methylsulpho-thiophene;
2-amino-3,5-bis-(methylsulpho)-thiophene,
5-amino-3-methyl-isothiazole,
2-amino-4-cyano-pyrazole,
2-(4'-nitrophenyl)-3-amino-4-cyanopyrazole,
3- or 4-aminophthalimide,
aminobenzene,
1-amino-4-chlorobenzene,
1-amino-4-bromobenzene,
1-amino-4-methylbenzene,
1-amino-4-nitrobenzene,
1-amino-4-cyanobenzene,
1-amino-2,5-dicyanobenzene,
1-amino-4-methylsulphonylbenzene,
1-amino-4-carbalkoxybenzene,
1-amino-2,4-dichlorobenzene,
1-amino-2,5-dichlorobenzene,
1-amino-2,4-dibromobenzene,
1-amino-2-methyl-4-chlorobenzene,
1-amino-2-trifluoromethyl-4-chlorobenzene,
1-amino-2-cyano-4-chlorobenzene,
1-amino-2-carbomethoxy-4-chlorobenzene, 1-amino-2-carbomethoxy-4-nitrobenzene,
1-amino-2-chloro-4-cyanobenzene,
1-amino-2-chloro-4-nitrobenzene,
1-amino-2-bromo-4-nitrobenzene,
1-amino-2-chloro-4-carbethoxybenzene
1-amino-2-chloro-4-methylsulphonylbenzene,
1-amino-2-methylsulphonyl-4-chlorobenzene,
1-amino-2-methylsulphonyl-4-nitrobenzene,
1-amino-2,4-dinitrobenzene,
1-amino-2,4-dicyanobenzene,
1-amino-2-cyano-4-methylsulphonylbenzene,
1-amino-2,6-dichloro-4-cyanobenzene,
1-amino-2,6-dichloro-4-nitrobenzene,
1-amino-2,4-dicyano-6-chlorobenzene,
4-aminobenzoic acid cyclohexyl ester,
1-amino-2,4-dinitro-6-chlorobenzene and especially
1-amino-2-cyano-4-nitrobenzene, and also
1-aminobenzene-2-, -3- or -4-sulphonic acid amides,
such as the N-methylamide or N,N-dimethylamide or N,N-diethyl amide.

Diazo components of formula

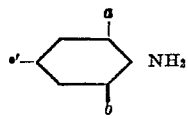

wherein $a$, $b$ or $c'$ denote a residue of formula

—X—CO—NR—SO$_2$—R$_2$ should be mentioned particularly.

The group $a$ is preferably the residue of formula

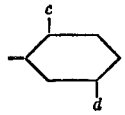

wherein $c$ and $d$ are hydrogen atoms or methyl, ethyl, methoxy, ethoxy, phenylthio or phenoxy residues.

The group $c$ is preferably bonded in the ortho-position to the azo group and can, in addition to the above-mentioned groups, also denote a chlorine or bromine atom, a trifluoromethyl group, an alkylsulphonyl group, preferably a methylsulphonyl group, and an acylamino group which is optionally alkylated, preferably methylated, at the nitrogen atom and in which the acyl residue is the residue of an organic monocarboxylic acid, an organic monosulphonic acid, such as methanemonosulphonic, ethanemonosulphonic or p-toluenemonosulphonic acid, or the residue of a carbamic acid monoester or monoamide or of a carbonic acid monoester or monoamide, such as phenoxycarbonyl, methoxycarbonyl and aminocarbonyl, or the residue of formula —CO—NR—SO$_2$—R$_2$.

The groups R$_1'$ and R$_2'$ may be hydrogen atoms or lower alkyl groups, that is to say alkyl groups containing 1 to 4, preferably 2 to 4, carbon atoms, such as methyl, ethyl, n-propyl or n-butyl groups which may be substituted in the usual manner such as for example benzyl or β-phenylethyl groups, halogenated alkyl groups, such as β-chlorethyl, β,β,β-trifluorethyl, β,γ-dichloropropyl, β-cyanethyl, alkoxyalkyl, such as β-ethoxyethyl or γ-methoxybutyl, hydroxyalkyl, such as β-hydroxyethyl, β,γ-dihydroxypropyl, nitroalkyl, such as β-nitroethyl, carbalkoxy, such as β-carbo-(methoxy, ethoxy or propoxy)-ethyl (with the terminal alkyl group being permitted to carry nitrile, carbalkoxy, acyloxy and amino groups in the ω-position), β- or γ-carbo-(methoxy or ethoxy)-propyl, acylaminoalkyl, such as β-(acetyl or formyl)-aminoethyl, acyloxyalkyl, such as β-acetoxyethyl, β,γ-diacetoxypropyl, β-(alkyl or aryl)-sulphonylalkyl, such as β-methanesulphonylethyl, β-ethanesulphonylethyl or β-(p-chlorobenzenesulphonyl)-ethyl, alkyl- or aryl-carbamoyloxyalkyl, such as β-methylcarbamyloxyethyl and β-phenylcarbamyloxyethyl, alkyloxycarbonyloxyalkyl, such as β-(methoxy, ethoxy or iso-propoxy) - carbonyloxyethyl, γ - acetamidopropyl, β - (p-nitrophenoxy)-ethyl, β-(p-hydroxyphenoxy)-ethyl, β-(β'-acetylethoxycarbonyl)-ethyl, β-[β'-cyano, hydroxy, methoxy or acetoxy)ethoxycarbonyl]-ethyl, cyanalkoxyalkyl, β-carboxyethyl, β-acetylethyl, γ-aminopropyl, β-diethylaminoethyl, β-cyanacetoxyethyl and β-benzoyl-β-(p-alkoxy or phenoxy-benzoyl)-oxyethyl groups.

Particularly preferably, R$_1'$ and/or R$_2'$ denote a residue of formula —alkylene—X—CO—NR—SO$_2$—R$_2$, such as for example a β-(N-phenylsulphonyl-N-methylaminocarbonyloxy)-ethyl or a γ-(N-methylsulphonyl-N-methylaminocarbonylamino)-propyl residue.

The groups R$_1$ and R$_2$ generally contain not more than 18 carbon atoms.

Another preferred type of monoazo dyestuffs has the formula R$_2$SO$_2$—NR—CO—X—D'—N=N—A', wherein D' is an optionally substituted p-phenylene residue and A' is the residue of a coupling component such as for example a phenol, an enol, an aromatic amine or a pyrazolone, D' preferably being a residue of formula

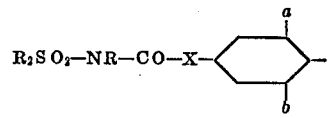

wherein $a$ and $b$ have the same significance as above.

Particularly preferred disazo dyestuffs are those of formula

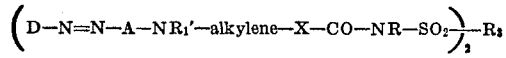

wherein D, A, R, R$_1'$ and X have the same significance as above and R$_3$ is a bivalent organic residue, especially an aliphatic, araliphatic, cycloaliphatic, aromatic or heterocyclic residue such as for example a hexamethylene-1,6- or phenylene-1,3 residue.

Further dyestuffs to be mentioned are the disazo dyestuffs of formula

wherein R$_1'$ and R$_2'$ have the same significance as above, and the disazo dyestuffs of formula

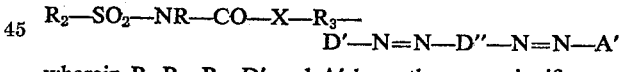

wherein R, R$_2$, R$_3$, D' and A' have the same significance as above and D'' is a p-phenylene residue.

Styryl dyestuffs

Preferred styryl dyestuffs are those of formula

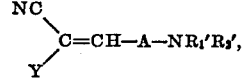

wherein A, R$_1'$ and R$_2'$ have the same significance as above and Y is a nitrile, carbalkoxy or arylsulphonyl group, such as for example a carbethoxy or phenylsulphonyl group.

Particularly interesting dyestuffs are those of formula

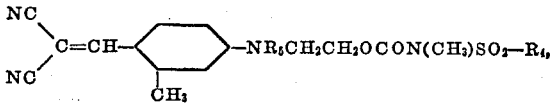

wherein R$_4$ is an alkyl group or preferably an aromatic group such as a phenyl group and R$_5$ is an alkyl, or aralkyl group or the residue of formula

—CH$_2$CH$_2$OCON—(CH$_3$)SO$_2$R$_4$.

Preferred bis-styryl dyestuffs are those of formula

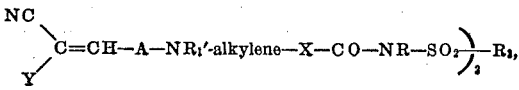

wherein R, $R_1'$, $R_3$, A, X and Y have the same significance as above.

Anthraquinoid dyestuffs

Dyestuffs according to the invention of the anthraquinone series are for example anthraquinone derivatives of formula $$A\text{---}[X\text{---}CO\text{---}NR\text{---}SO_2\text{---}R_2]_n,$$

wherein $n$ is an integer from 1 to 4, preferably 1, X, R and $R_2$ have the same significance as above and A denotes an anthraquinone residue having 3 or 4 condensed rings, which contain one or more other substituents such as for example halogen atoms such as fluorine, chlorine or bromine, hydroxyl groups, alkoxy groups, amino groups, acylamino groups, alkylamino groups having 1 to 3 carbon atoms, acyloxy groups, optionally substituted aryl residues, optionally substituted heterocyclic residues, arylamino groups, wherein the aryl residue is preferably a phenyl group which may be substituted by one or more halogen atoms, alkyl or alkoxy groups, alkylsulphonyl or optionally substituted phenylsulphonyl groups, alkylthioether or optionally substituted phenylthioether residues as well as nitro, nitrile, carboxylic acid ester and acetyl groups. Examples of tetracyclic anthraquinone residues are 1,9-isothiazolanthrone, 1,9-anthrapyrimidine or 1,9-pyrazolanthrone. The alkyl residues are preferably lower alkyl residues which can contain up to 6 carbon atoms.

Preferred anthraquinone dyestuffs are for example those of formula

[anthraquinone structure with $B_{n-1}$ substituent and $Z_1$, $Z_2$, $Z_3$, $Z_4$ positions]

wherein B denotes a halogen atom, especially a bromine or chlorine atom, or an alkyl or alkoxy group, especially methyl or methoxy, $n=1$ or 2 and $Z_1$, $Z_2$, $Z_3$ and $Z_4$ each denote a hydrogen atom, an amino or hydroxyl group which is optionally substituted by an alkyl, aralkyl, cycloalkyl, aryl or heterocyclic residue, or an amino or hydroxyl group substituted by an organic acid residue, with at least one of the symbols $Z_1$, $Z_2$, $Z_3$ or $Z_4$ containing or denoting a group of formula $$\text{---}X\text{---}CO\text{---}NR\text{---}SO_2\text{---}R_2$$

such as for example a group of formula $$\text{---}NH\text{---}C_6H_4\text{---}NH\text{---}CO\text{---}NH\text{---}SO_2\text{---}R_2$$

or $\text{---}N(CH_3)\text{---}CO\text{---}N(CH_3)\text{---}SO_2\text{---}R_2$, wherein $R_2$ has the same significance as given above.

Other preferred anthraquinone dyestuffs are for example those of formula

[anthraquinone structure with $B_{n-1}$, Y, $Z_2$, $Z_3$, $Z_4$ positions]

wherein $Z_2$, $Z_3$, $Z_4$, B and $n$ have the same significance as above and Y is a residue of formulae $=N\text{---}NH\text{---}$, $=N\text{---}NR_1'\text{---}$, $=N\text{---}CO\text{---}NR_1'\text{---}$, $=CH\text{---}CO\text{---}NR_1'\text{---}$ or $=N\text{---}S\text{---}$, wherein $R_1'$ has the same significance as above, but is preferably a methyl group.

Further preferred anthraquinone dyestuffs are for example those of formula

[anthraquinone structure with $B_{n-1}$, $Z_1$, $Z_2$, $Z_3$, $Z_4$ and $\text{---}X'\text{---}A''\text{---}X\text{---}CO\text{---}NR\text{---}SO_2\text{---}R_2$]

wherein $Z_1$, $Z_2$, $Z_3$, $Z_4$, B, $n$, X, R and $R_2$ have the same significance as above, A" is an aliphatic, araliphatic, aromatic or heterocyclic residue which is optionally interrupted or substituted by hetero-atoms, and X' is a direct bond, a sulphonyl, sulphonyloxy or sulphonylamino group or has the same significance as given for X. Amongst these dyestuffs, the subgroup wherein the symbol X' is a direct bond, the symbol Hal is a chlorine or bromine atom, the group X is an oxygen atom and the group R is a lower alkyl residue or a hydrogen atom, and the group A" is a p-phenylene residue which can furthermore carry alkoxy, hydroxyl, phenoxy or acyloxy groups is particularly of interest.

The new dyestuffs are manufactured (a) by reacting a dyestuff which contains at least one group of formula $\text{---}XH$, wherein X has the same significance as above, with at least one sulphonylisocyanate which contains at least one group of formula $\text{---}SO_2\text{---}N=C=O$ or (b) by linking two components of which at least one component contains at least one group of formula $$\text{---}X\text{---}CO\text{---}NR\text{---}SO_2\text{---}$$

by condensation or coupling to give a dyestuff which contains at least one group of formula $$\text{---}X\text{---}CO\text{---}NR\text{---}SO_2\text{---},$$

or (c) by acylation or preferably N—C condensation (with the formation of a N—C bond) of a compound possessing dyestuff character which contains at least one of the groups of formulae $\text{---}X\text{---}CO\text{---}NH\text{---}SO_2$ or $\text{---}NH\text{---}CO\text{---}NR_1\text{---}SO_2\text{---}$ with a compound which is preferably an alkylating compound. Stage (c) serves to introduce the groups R and/or $R_1$.

(I) Process variant (a)

(A) Sulphonylisocyanates.—Possible sulphonylisocyanates for embodiment (a) are optionally substituted aliphatic, cycloaliphatic, araliphatic, aromatic and heterocyclic sulphonylisocyanates such as for example methyl-sulphonylisocyanate,
ethyl-sulphonylisocyanate,
isopropyl-1-sulphonylisocyanate,
n-propyl-1-sulphonylisocyanate,
n-butyl-1-sulphonylisocyanate,
propen-1-yl-sulphonylisocyanate,
n-hexen-1-yl-sulphonylisocyanate,
4,4-dichlorobuten-1-yl-sulphonylisocyanate,
2-chlorovinyl-sulphonylisocyanate,
cyclohexyl-1-sulphonylisocyanate,
cyclohexen-1-yl-sulphonylisocyanate,
2-chlorethyl-sulphonylisocyanate,
2-chloropropyl-sulphonylisocyanate,
2-chlorohexyl-sulphonylisocyanate,
2-methyl-2-chloropropyl-sulphonylisocyanate,
2-vinyl-sulphonylisocyanate,
phenyl-sulphonylisocyanate,
4-tolyl-sulphonylisocyanate,
4-chlorophenyl-sulphonylisocyanate,
4-fluorophenyl-sulphonylisocyanate,
4-bromophenyl-sulphonylisocyanate,
4-methoxyphenyl-sulphonylisocyanate,
2,5-dimethyl-phenyl-sulphonylisocyanate,
3-nitrophenyl-sulphonylisocyanate,
4-nitrophenyl-sulphonylisocyanate,
2-methylphenylene-1,4-bis(sulphonylisocyanate), n-butylene-1,4-bis(sulphonylisocyanate),
n-hexylene-1,6-bis(sulphonylisocyanate),
phenylene-1,3-bis-(sulphonylisocyanate),
naphthalene-1,5-bis-(sulphonylisocyanate),
benzthiazolyl-2-sulphonylisocyanate,
thienyl-2-sulphonylisocyanate, and
the sulphonyldiisocyanate of formula $SO_2(NCO)_2$.

The general manufacture of the sulphonylisocyanate is described by Henri Ulrich, Chemical Reviews, 1965, pp. 369–371 and by Henry Ulrich and A. A. R. Sayigh, Zeitschrift für angewandte Chemie, 1966, pp. 761–769.

The sulphonylisocyanates are particularly conveniently manufactured by phosgenation of sulphonamides such as for example of methanesulphonamide,
ethanesulphonamide,
1-butanesulphonamide,
1,3-propanedisulphonamide,
1-propanesulphonamide,
ethylenemonosulphonamide,
α-toluenesulphonamide,
phenethylsulphonamide,
benzenesulphonamide,
o-toluenesulphonamide,
p-toluenesulphonamide,
p-acetylamino-benzenesulphonamide,
4-bromobenzenesulphonamide,
2-methoxy-4-methyl-5-bromobenzenesulphonamide,
1-naphthalenesulphonamide,
2-naphthalenesulphonamide,
3-pyridinesulphonamide,
6-quinolinesulphonamide,
2-imidazolsulphonamide,
2-benzimidazolesulphonamide,
1,2,4-triazole-3-sulphonamide,
2-thiazolesulphonamide,
2-benzthiazolesulphonamide,
2-pyrimidinesulphonamide,
2-pyrazinesulphonamide,
2-nitrofuranesulphonamide, and
2-acetylamino-1,3,4-thiadiazole-5-sulphonamide.

(B) Dyestuff components.—The following dyestuffs are for example suitable for use as reactive components which are reacted with the sulphenylisocyanates mentioned in accordance with the invention.

(1) Azo dyestuffs:

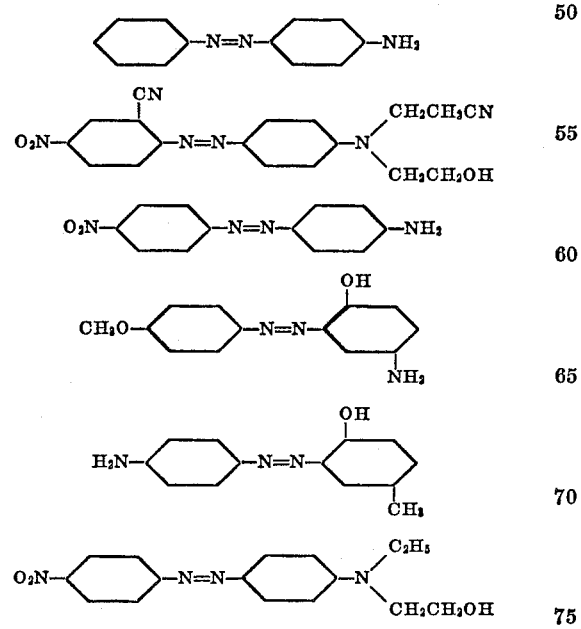

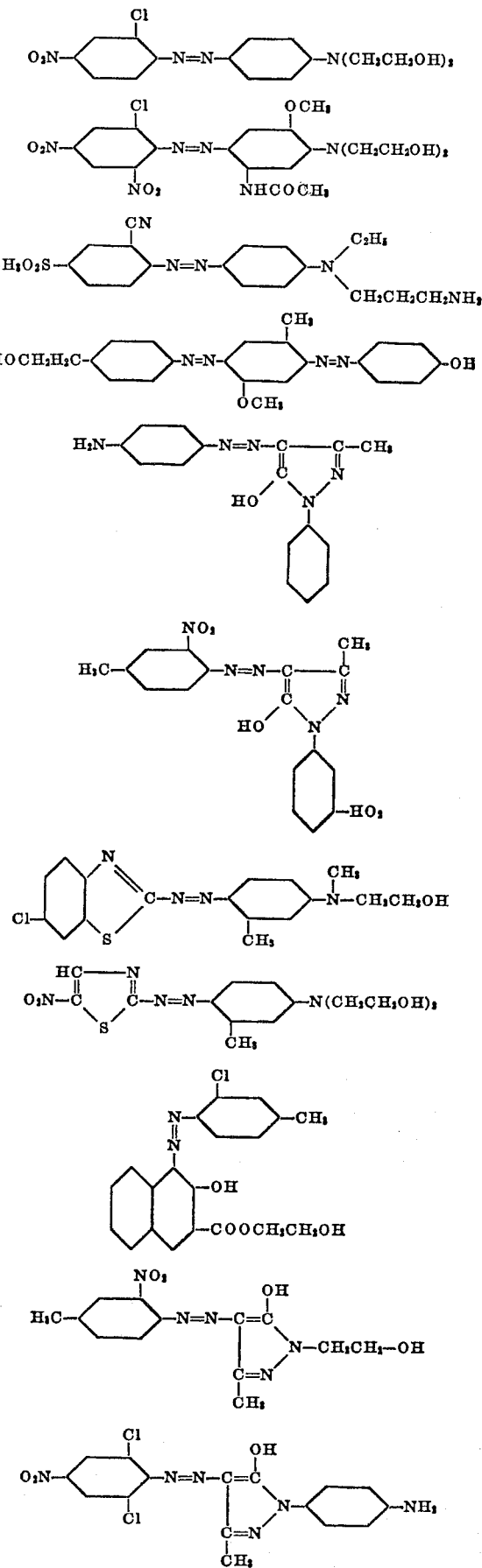

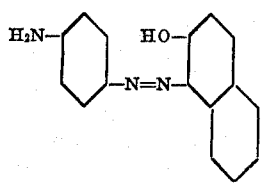 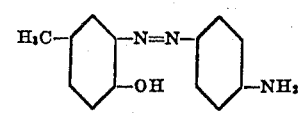

(2) Anthraquinone dyestuffs:

1-aminoanthraquinone,
2-aminoanthraquinone,
1-amino-5-chloro-8-hydroxyanthraquinone,
1-amino-2-bromanthraquinone,
1-amino-5-hydroxy-6,8-dichloranthraquinone,
1-amino-5,8-dichloranthraquinone,
1-amino-5-nitroanthraquinone,
1-amino-5-chloro-8-methoxyanthraquinone,
1-amino-7-chloranthraquinone,
1-amino-6-chloroanthraquinone,
1-amino-6- or -7-fluoranthraquinone,
1-amino-6- or -7-bromanthraquinone,
1-amino-6,7-dichloranthraquinone,
1-amino-6,7-difluoranthraquinone,
1-amino-2-($\beta$-hydroxyethyloxy)-4-hydroxyanthraquinone,
1-amino-2-bromanthraquinone,
1-amino-2-methylanthraquinone,
1-($\beta$-aminoethylamino)-4-acetylaminoanthraquinone,
1-($\beta$-aminoethylamino)-anthraquinone,
1-acetylamino-4-hydroxyanthraquinone,
1-amino-4-hydroxyanthraquinone,
1-amino-4-chloranthraquinone,
1-amino-4-guanidinoanthraquinone,
1-amino-4-($\beta$-hydroxyethylamino)-anthraquinone,
1-amino-2,4-dibromanthraquinone,
1-(2-hydroxyethylamino)-anthraquinone,
1-amino-2-isopropylmercaptoanthraquinone,
1-amino-2-methoxy-4-hydroxyanthraquinone,
1,2-diaminoanthraquinone,
1-hydroxyanthraquinone,
2-hydroxyanthraquinone,
1,2-dihydroxyanthraquinone,
1,4-dihydroxyanthraquinone,
1,8-dihydroxyanthraquinone,
1,2,4-trihydroxyanthraquinone,
2,6-dihydroxyanthraquinone,
1,2,5,8-tetrahydroxyanthraquinone,
1,2,4,5,6,8-hexahydroxyanthraquinone,
1-hydroxy-4-acetylaminoanthraquinone,
1,4-diaminoanthraquinone,
1,4-diamino-2-cyananthraquinone,
1,4-diamino-2-methoxyanthraquinone,
1,4-diamino-2-carbamoylanthraquinone,
1,4-diamino-5-nitroanthraquinone,
1,4-diamino-2,3-dimethoxyanthraquinone,
1,4-diamino-2,3-dicyananthraquinone,
1,4-bis-(p-amino-anilino)-5-hydroxyanthraquinone,
1,4-bis-(p-amino-anilino)-5,8-dihydroxyanthraquinone,
1,4-bis-(p-amino-anilino)-anthraquinone,
1,5-bis-(p-amino-anilino)-2-methyl-anthraquinone,
1,5-bis-(p-aminoanilino)-4,8-dihydroxyanthraquinone,
1,5-bis-(p-aminoanilino)-2-($\beta$-hydroxyethylmercapto)-anthraquinone,
1,5-bis-($\beta$-hydroxyethylamino)-anthraquinone,
1,4-dihydroxy-2-($\beta'$-hydroxyethyl-$\beta$-oxethyl)-anthraquinone,
1,4-dihydroxy-2-($\beta'$-hydroxyethyl-$\beta$-mercaptoethyl)-anthraquinone,
1,4-dihydroxy-2-($\beta''$-hydroxyethyl-$\beta'$-oxyethyl-$\beta$-oxyethyl)-anthraquinone,
1,6-diaminoanthraquinone,
1,8-diaminoanthraquinone,
1,8-diamino-2-methylanthraquinone,
1,8-bismethylaminoanthraquinone,
1-methylamino-2-isopropylmercaptoanthraquinone,
1-methylamino-4-butylaminoanthraquinone,
1-anilino-2-chlor-4-aminoanthraquinone,
1-methylamino-4-(p-amino-anilino)-anthraquinone,
1-methylaminoanthraquinone,
1,4,5-triaminoanthraquinone,
1,4,5-trihydroxyanthraquinone,
1,4,5,8-tetraaminoanthraquinone,
1,4,5,8-tetrahydroxyanthraquinone,
1 - (amino- or hydroxy)-4-methoxy, ethoxy, propoxy, 1-butoxy or cyclohexyloxy)-anthraquinone,
1-(amino or hydroxy)-4- or 5-[2',3' or 4'-(chlorofluoro, bromo, methyl, methoxy, $\beta$-methoxyethyl, cyano or trifluoromethyl)-phenylamino]-anthraquinone,
1-(amino or hydroxy)-4- or -5-[2', 3' or 4'-(chloro, fluoro, bromo, methyl, methoxy or ethyl)-benzoylamino]-anthraquinone,
1-(amino or hydroxy)-4- or -5-(methyl, ethyl, n- or isopropyl, n-, iso or tertiary-butyl, $\beta$-methoxyethyl, $\beta$-cyanethyl or chloromethyl)-carbonylaminoanthraquinone,
1-(amino or hydroxy)-4- or -5-(methyl, ethyl, propyl, $\beta$-methoxyethyl or $\beta$-cyanethyl)-aminoanthraquinones,
1,5-diamino-4,8-dihydroxy-2-($\beta$-hydroxyethylmercapto)-anthraquinone,
1-amino-4-cyclohexylamino-2-anthraquinonecarboxamide,
1,4-diamino-2,3-anthraquinonedicarboxamide,
1-hydroxy-4-amino-2,3-anthraquinonedicarboximide,
1,4-diaminoanthraquinone-2,3-dicarboxylic acid-$\beta$-hydroxyethylimide,
5-amino-1,9-isothiazoleanthrone,
4-amino-1,9-anthrapyrimidine,
5-amino-1,9-anthrapyrimidine, and
2- or 3-aminobenzanthrone.

Representatives of the 2- or 3-phenyl-anthraquinone substituted in the 1,4,5,8-position are 1,5-dihydroxy-4,8-diamino-2- or -3-(3'-methoxy-4'-hydroxyphenyl)-anthraquinone,
1,5-dihydroxy-4,8-diamino-2- or -3-(4'-hydroxyphenyl)-anthraquinone,
1,5-dihydroxy-4,8-diamino-2- or -3-(4'-hydroxy-2'-methylphenyl)-anthraquinone,
1,5-dihydroxy-4,8-diamino-2- or 3-(4'-hydroxyphenyl)-6- or -7- bromanthraquinone,
1,5-dihydroxy-4,8-diamino-2- or -3-(4'-hydroxy-3'- or 2'-bromophenyl)anthraquinone, and
1,5-dihydroxy-4-amino-8-acetoxyethylamino-2- or -3-(4'-hydroxyphenyl)-anthraquinone.

(3) Nitro dyestuffs:

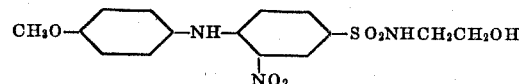

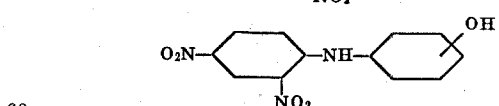

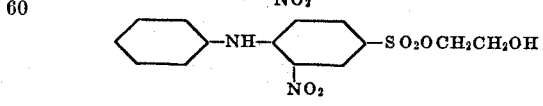

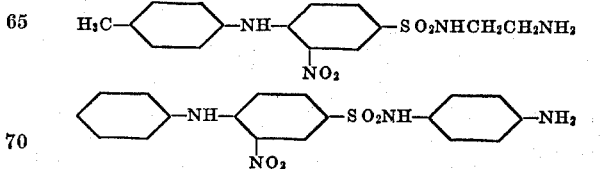

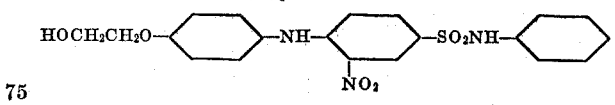

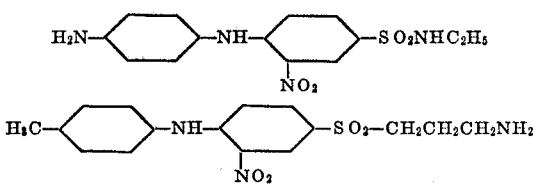

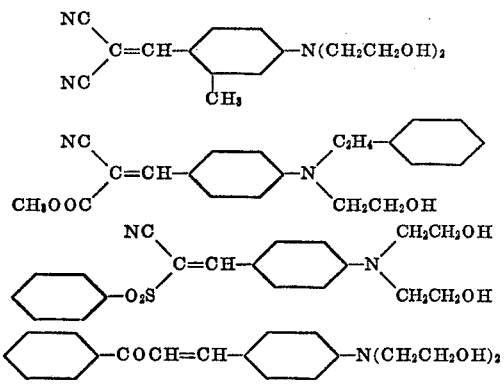

4-sulphamido-2-nitrodiphenylamino-2'-, 3'- or -4'-carboxylic acid β-hydroxyethyl ester and 4'-phenylazo-2-nitro-diphenylamine-4-sulphonic acid N-β-hydroxyethylamide.

(4) Styryl dyestuffs:

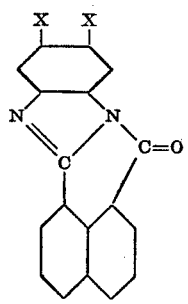

(5) Perinone dyestuffs: Mixtures of the dyestuffs of formula

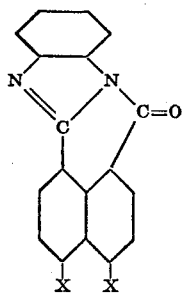

or mixtures of the dyestuffs of formula wherein, in each case, one X represents a group of formula —NH₂ and one X represents a hydrogen atom.

(C) Reaction conditions.—The sulphonylisocyanates are, because of their high reactivity, employed in the form of solutions in aqueous inert organic solvents such as methylene chloride, chloroform, carbon tetrachloride, benzene, chlorinated benzenes, chlorinated higher aromatic hydrocarbons, diethylene, diisopropyl ether, dioxane and acetonitrile. The reaction may take place at room temperature or at higher temperatures. Normally the solution of the sulphonylisocyanate is added slowly to the dyestuff which is to be reacted or to the dyestuff component which is to be reacted. The other conditions for a selective reaction, such as low temperature, optionally below room temperature, and the use of dilute solutions of the reagents, are also observed. If necessary, reactive groups which are present such as hydroxyl or amino groups are protected with suitable protective groups, for example acyl residues, optionally in the presence of catalysts, for example pyridine.

(II) Process variant (b)

(A) Azo dyestuffs (coupling).—The azo dyestuffs according to the invention can also be obtained by coupling a diazonium compound of an amine with a coupling component, with at least one of the components having to contain a group of formula —X—CO—NR—SO₂—R₂.

(1) Diazo components: Suitable diazo components which contain the group of formula

—X—CO—NR—SO₂—R₂ are obtained by reaction of an aromatic or heterocyclic nitro compound which possesses at least one group of formula —XH, such as for example 2-hydroxy-4-methylsulphonyl-nitrobenzene, 4 - hydroxy-2-methylsulphonyl-nitrobenzene or 2,6-dichloro-4-hydroxy-nitrobenzene with a sulphonylisocyanate, an optionally occurring alkylation of the imino group, and subsequent reduction of the nitro group.

As diazo components *without* groups of formula

—X—CO—NR—SO₂ it is possible to use the above-mentioned diazo components of formula D—NH₂, to the extent that these are not derived from a sulphonylisocyanate.

(2) Coupling components: Suitable coupling components which contain a group of formula

—X—CO—NR—SO₂ are obtained by reaction of one of the components given below with a sulphonylisocyanate and optional subsequent alkylation:

N-β-hydroxyethyl-N-ethylaniline,
N-β-hydroxyethyl-N-cyanethylaniline,
N,N-bis-β-hydroxyethylaniline,
3-acetamino-6-methoxy-N,N-bis-β-hydroxyethylaniline,
3-amino-N,N-bis-β,β-acetoxyethylaniline,
3-amino-N,N-bis-β,β-cyanethylaniline,
1-β-hydroxyethyl-3-methylpyrazolone-(5)-, and
the β-hydroxyethylamide of 8-hydroxynaphthalene-5- or -6-sulphonic acid.

As coupling components *without* groups of fromula —X—CO—NR—SO₂—, the following may for example be mentioned:

N,β-cyanethyl-N-methyl-aminobenzene,
N,N-di-β-hydroxyethylaminobenzene,
1-N-β-cyanethyl-N-ethylamino-3-methylbenzene,
3-cyano-2,6-dihydroxy-4-methylpyridine,
1-N-β-cyanethylamino-3-methylbenzene,
1-N,N-di-β-hydroxyethyl-amino-3-thiocyanatobenzene,
N-β-cyanethyl-naphthasultam-(1,8),
1-N,N-di-β-cyanethyl-3-methyl-aminobenzene,
N,β-cyanethyl-N,β-hydroxyethyl-aminobenzene,
N,β-cyanethyl-2-methyl-indole,
N,β-cyanethyl-tetrahydroquinoline,
N-phenyl-aminobenzene,
4-hydroxy-1-methylquinolone-(2),
1-hydroxy-4-methylbenzene,
2-hydroxy-3-naphthol-acid-o-anisidide,
8-hydroxyquinoline,
2-naphthylamine-5-sulphomethylamide,
1,3-dihydroxybenzene,
1-hydroxy-3-cyanomethylbenzene,
1-phenyl-3-methyl-5-pyrazolone and acetoacetic ester.

(3) Diazotization and coupling: The diazotization of the diazo components mentioned can take place according to methods which are in themselves known, for example with the aid of a mineral acid and sodium nitrite or for example with a solution of nitrosylsulphuric acid in concentrated sulphuric acid.

The coupling can also be carried out in a manner which is in itself known, for example in a neutral to acid medium, optionally in the presence of sodium acetate or similar buffer substances which influence the coupling speed, or of catalysts such as for example dimethylformamide, pyridine or their salts.

The coupling also takes place advantageously if the components are combined by means of a mixing nozzle. This is to be understood as a device in which the liquids to be mixed are combined with one another in a relatively small space, with at least one liquid being passed through a nozzle, preferably at an elevated pressure. The mixing nozzle can for example be constructed, and can operate, according to the principle of a water-jet pump, with the feed of one liquid into the mixing nozzle corresponding to the feed of water into the waterpump and the feed of the other liquid into the mixing nozzle corresponding to the connection of the water-jet pump to the vessel which is to be evacuated, with this latter liquid feed also being allowed to take place at elevated pressure.

Other suitable devices can however also serve for rapid optionally continuous mixing in a small space.

After the coupling reaction has taken place the resulting non-quaternized dyestuffs can easily be separated from the coupling mixture, for example by filtration, since they are practically insoluble in water. If the resulting dyestuffs are quaternized, they are salted out.

(B) Styryl dyestuffs (condensation). — In order to manufacture the styryl dyestuffs according to the invention, for example an aldehyde of formula $$OHC-\underset{c''}{\bigcirc}-N\underset{R_2'}{\overset{R_1'}{\diagdown}}$$

wherein $c''$ represents a hydrogen atom or preferably a methyl group and $R_1'$ and $R_2'$ have the significance given above, can be condensed with a nitrile compound of formula $$\underset{X}{\overset{NC}{\diagdown}}CH_2$$

with the application of heat in the presence of a basic catalyst such as for example ammonia, dimethylamine, diethylamine, piperidine, piperidine acetate, sodium alcoholate or potassium alcoholate, optionally in the presence of a solvent such as methanol, ethanol, benzene, toluene, xylene, chloroform or carbon tetrachloride. Suitable nitrile compounds of formula NC—CH$_2$—X for the reaction of the styryl dyestuff are for example: malonic acid dinitrile, cyanacetic acid methyl ester, cyanacetic acid ethyl ester, cyanacetic acid butyl ester, cyanacetamide, cyanacetmethylamide, cyanacetdimethylamide, methylsulphonylacetonitrile and phenylsulphonylacetonitrile.

When using solvents the water produced in the reaction can be continuously removed from the reaction mixture by azeotropic distillation of these solvents, as a result of which the reaction equilibrium is constantly displaced in favor of the condensation product. The condensation can also take place without a basic catalyst in glacial acetic acid or some other organic acid or in the presence of a solvent by fusing the reagents together in the presence of a basic catalyst, for example ammonium acetate or piperidine acetate.

Anilines which are suitable as starting products are for example obtained by reacting a sulphonylisocyanate with for example 3-methyl-N,N-bis-$\beta$-hydroxyethyl-aniline,
3-methyl-N-benzyl-N-$\beta$-hydroxyethyl-aniline,
3-methyl-N-phenoxyethyl-N-$\beta$-hydroxyethyl-aniline,
3-methyl-N-$\beta$-acetoxyethyl-N-$\beta$-hydroxyethyl-aniline,
3-methyl-N-ethyl-N-$\beta$-hydroxyethyl-aniline, or
7-methyl-N-$\beta$-hydroxyethyl-quinoline.

(C) Nitro dyestuffs (condensation). — In order to manufacture ditro dyestuffs, a sulphonylisocyanate of formula $$O=C=N-SO_2-\underset{NO_2}{\bigcirc}-Cl$$

(manufactured by phosgenation of the sulphonamide of formula $$H_2N-O_2S-\underset{NO_2}{\bigcirc}-Cl)$$

can be condensed with 2 equivalents of an aniline which is optionally substituted at the aromatic nucleus.

The imino groups of the residues

—O—CO—NH—SO$_2$—, —NH—CO—NH—SO$_2$—
—S—CO—NH—SO$_2$—, —NR$_1$—CO—NH—SO$_2$—
and
—NH—CO—NR—SO$_2$— is effected by adding alkylating agents such as for example dimethylsulphate, diethylsulphate, methyl chloride, ethyl bromide, methanesulphonic acid methyl ester or the methyl or ethyl esters of 4-methyl-, 4-chloro-, or 4-nitro-benzenesulphonic acid in suitable organic solvents such as for example xylene, carbon tetrachloride, o-dichlorobenzene, nitrobenzene, dimethylformamide, dimethylsulphoxide, acetonitrile or dioxane, optionally with warming.

Further variants of the manufacturing process of sulphonylurethanes according to the invention (1) Reaction of chlorocarbonic acid esters with alkali salts of sulphonamides or with the free sulphonamides in the presence of alkali carbonate, with at least one of the two organic components having to possess dyestuff character.

(2) Reaction of the alkali or alkaline earth salts of sulphonamides which possess dyestuff character with pyrocarbonic acid esters in solution or in suspension up to temperatures of 90° C. and isolation of the free sulphonylurethanes from the resulting sulphonylurethane salts.

(3) Decomposition of sulphonylureas with alcohols possessing dyestuff character.

(4) Reaction of sulphochlorides with urethanes, with sulphochlorides and/or the urethanes possessing dyestuff character.

Quaternization

If the dyestuffs obtained according to the process of the invention and its variants contain quaternizable nitrogen atoms then these can be quaternized subsequent to the manufacture of the dyestuffs. Suitable quaternizable groups are for example those of formulae $$-N\underset{R_1^*}{\overset{R_1^*}{\diagdown}}, -N\underset{NH_2}{\overset{R_1^*}{\diagdown}}, -N\underset{R_2^*}{\overset{OR_1^*}{\diagdown}} \text{ and } -CONH-NR_1^*NR_2^*,$$

wherein $R_1^*$ and $R_2^*$ are alkyl residues which together can form a chain which is optionally interrupted by hetero-atoms, and the group of formula $$\underset{N}{\bigcirc}$$

as well as other heterocyclic structures which can be quaternized to cycloammonium groups, such as for example the residues of the above-mentioned heterocyclic diazo components of formula D—NH$_2$.

The quaternization is effected by treatment with esters of strong mineral acids or organic sulphonic acids such as for example dimethylsulphate, diethylsulphate, alkyl halides, such as methyl chloride, methyl bromide or methyl iodide, aralkyl halides, such as benzyl chloride, esters of low molecular alkanesulphonic acids, such as for example the methyl ester of methanesulphonic, ethanesulphonic or butanesulphonic acid and the alkyl esters of (4-methyl-, 4-chloro- or 3- or 4-nitro-)benzenesulphonic acid, which form halogen, sulphuric acid half-ester, alkanesulphonic or benzenesulphonic acid anions as anions, preferably whilst warming in inert organic solvents, for example xylene, carbon tetrachloride, o-dichlorobenzene and nitrobenzene. It is however also possible to use solvents such as acetic anhydride, dimethylformamide, acetonitrile or dimethylsulphoxide. The quaternized dyestuffs preferably contain, as the anion $Y^-$, the residue of a strong acid such as sulphuric acid or its half-esters, or a halide ion, but can also be used as double salts, for example with zinc chloride, or as free bases.

The quaternized dyestuffs for example correspond to the general formulae

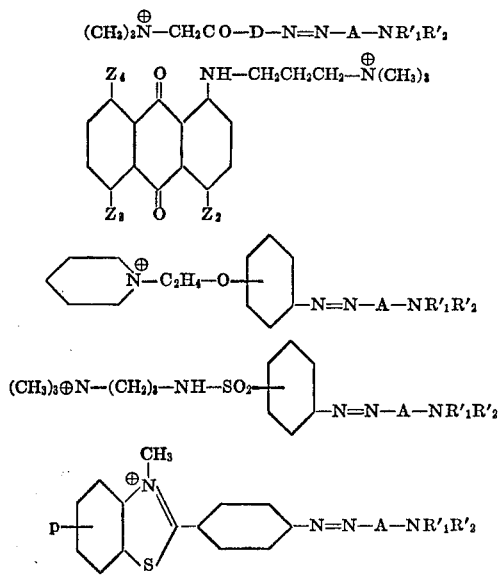

wherein $p$ is a hydrogen atom, a $C_1$–$C_2$ alkyl group or a negative substituent, and $D'$, $A$, $R'_1$, $R'_2$, $Z_2$, $Z_3$ and $Z_4$ have the same significance as above.

(III) Use

The dyestuffs described above as a rule contain no acid groups which confer solubility in water, especially no sulphonic acid groups, and are therefore sparingly soluble or insoluble in water. If they contain quaternized nitrogen atoms they are on the other hand soluble in water.

The water-insoluble dyestuffs, their mixtures with one another and their mixtures with other azo dyestuffs are, especially after conversion to a finely divided form, for example by grinding, conversion to pastes, reprecipitation etc., excellently suited to the dyeing and printing of synthetic fibres such as for example acrylic or acrylonitrile fibres, polyacrylonitrile fibres and copolymers of acrylonitrile and other vinyl compounds such as acrylic esters, acrylamides, vinylpyridine, vinyl chloride or vinylidene chloride, copolymers of dicyanethylene and vinyl acetate, as well as fibres of acrylonitrile block copolymers, fibres of polyurethanes, polyolefines, cellulose triacetate and 2½-acetate, polyamides, such as nylon 6, nylon 6,6 or nylon 12, and especially fibres of aromatic polyesters such as those obtained from therephthalic acid and ethylene glycol or 1,4-dimethylolcyclohexane, and copolymers of terephthalic and isophthalic acid and ethylene glycol.

The subject of the present invention is therefore also a process for the dyeing or printing of synthetic fibres, especially of polyester fibres, which is characterized in that dyestuffs which are free of carboxyl and sulphonic acid groups, which contains at least one group of formula —X—CO—NR—SO$_2$—, wherein R is an acyl group or preferably a hydrogen atom or an optionally substituted alkyl, cycloalkyl, aryl or heterocyclic group and X is an oxygen or sulphur atom or a group of formula —NR$_1$—, wherein R$_1$ is an acyl group or preferably a hydrogen atom or an optionally substituted alkyl, cycloalkyl, aryl or heterocyclic group, their mixtures with one another or their mixtures with other dyestuffs are used.

Preferably, azo dyestuffs, especially monoazo dyestuffs and disazo dyestuffs, anthraquinones, perinones, styryl dyestuffs and nitro dyestuffs are used.

Amongst the types of fibres, the group of fibres containing ester groups, and above all the polyester fibres, deserve particular emphasis.

For dyeing, the water-insoluble non-quaternized dyestuffs are appropriately used in a finely divided form and dyeing is effected with the addition of dispersing agents such as sulphite cellulose waste lye or synthetic detergents, or a combination of various wetting and dispersing agents. As a rule it is appropriate to convert the dyestuffs to be used, before dyeing, into a dyeing preparation which contains a dispersing agent and finely divided dyestuff in such a form that on dilution of the dyestuff preparations with water a fine dispersion is produced. Such dyestuff preparations can be obtained in a known manner, for example by grinding the dyestuff in a dry or wet form with or without the addition of dispersing agents during the girnding process. The above-mentioned synthetic fibres can also be dyed in organic solvents in which the dyestuff is present as a solution.

In order to achieve intense dyeings on polyethylene terephthalate fibres it proves appropriate to add a swelling agent to the dyeing bath or to carry out the dyeing process under pressure at temperature above 100° C., for example at 120° C. Suitable swelling agents are aromatic carboxylic acids, for example, benzoic acid or salicylic acid, phenols such as for example o- or p-hydroxydiphenyl, salicylic acid methyl ester, aromatic halogen compounds such as for example chlorobenzene, o-dichlorobenzene or trichlorobenzene, phenylmethylcarbinol or diphenyl. When dyeing under pressure it proves advantageous to render the dyeing bath weakly acid, for example by adding a weak acid, for example acetic acid.

The non-quaternized water-insoluble dyestuffs to be used in accordance with the invention prove to be particularly suitable for dyeing according to the so-called thermofixing process, according to which the fabric to be dyed is impregnated with an aqueous dispersion of the dyestuff which appropriately contains 1 to 50% of urea and a thickener, especially sodium alginate, preferably at temperatures of at most 60° C., and is squeezed out in the usual manner. It is appropriate to squeeze out in such a way that the impregnated goods retain 50 to 100% of their starting weight of dyeing liquor.

In order to fix the dyestuff, the fabric impregnated in this way is, appropriately after a prior drying, for example in a warm stream of air, heated to temperatures of above 100° C., for example between 180 and 210° C.

The thermofixing process which has just been mentioned is of particular interest for dyeing mixed fabrics of polyester fibres and cellulose fibres, especially cotton. In this case the padding liquor contains, in addition to the non-quaternized water-insoluble dyestuff to be used according to the invention, also dyestuffs which are suitable for dyeing cotton, for example direct dyestuffs or vat dyestuffs, or especially so-called reactive dyestuffs, that is to say dyestuffs which can be fixed to the cellulose fibre with the formation of a chemical bond, that is to say for example dyestuffs containing a chlorotriazine or chlorodiazine residue. In the latter case it proves appropriate to add an acid-binding agent, for example an alkali carbonate or alkali phosphate, alkali borate or alkali perborate or their mixtures to the padding solution. When using vat dyestuffs it is necessary for the padded fabric after heat treatment to be treated with an aqueous alkaline solution of a reducing agent which is usual in vat dyeing.

The dyeings on polyester fibres obtained according to the present process are appropriately subjected to a post-treatment, for example by heating with an aqueous solution of a non-ionic detergent.

Instead of being applied by impregnation, the dyestuffs specified can, according to the present process, also be applied by printing. For this purpose a printing ink is for example used which in addition to the auxiliary substances usual in printing, such as wetting agents and thickeners, contain the finely dispersed dyestuff optionally mixed with one of the above-mentioned cotton dyestuffs, optionally in the presence of urea and/or an acid-binding reagent.

Using the present process, intense dyeings and prints of excellent fastness properties, especially good fastness to light, sublimation, decatizing, washing and chlorine water are obtained. The dyeings on acetate rayon are furthermore distinguished by good gas fastness. A further advantage resides in the good wool and cotton reserve of the dyestuffs to be used in accordance with the process.

The new water-insoluble non-quaternized dyestuffs can also be used for the spin dyeing of polyamide, polyesters and polyolefines. The polymer to be dyed is appropriately mixed, in the form of powders, granules or chips, as a finished spinning solution or in the fused state, with the dyestuff which is introduced in the dry state or in the form of a dispersion or solution in a solvent which may be volatile. After homogeneous distribution of the dyestuff in the solution or melt of the polymer the mixture is processed in a known manner by casting, pressing or extrusion to give fibres, yarns, monofilaments, films and the like.

The new water-soluble quaternized dyestuffs or dyestuff salts are suitable for dyeing and printing the most diverse fully synthetic fibres such as for example polyvinyl chloride, polyamide, polyurethane and especially polyacrylic fibres.

The new dyestuffs are furthermore also suitable for the bulk coloring of polymerization products of acrylonitrile, of polyolefines and also of other plastic compositions, and are also suitable for the coloring of oil paints and lacquers. It is also possible to use the above-mentioned thermofixing process.

The new water-insoluble non-quaternized dyestuffs in part also represent valuable pigments which can be used for the most diverse pigment applications, for example in a finely divided form for dyeing rayon and viscose or cellulose ethers and esters, for the manufacture of inks, especially ball pen inks, as well as for the manufacture of colored lacquers or lacquer-forming substances, solutions and products made of acetylcellulose, nitrocellulose, natural resins or synthetic resins, such as polymerization resins or condensation resins, for example aminoplasts, alkyd resins, phenoplasts, polyolefines such as polystyrene, polyvinyl chloride, polyethylene, polypropylene, polyacrylonitrile, rubber, casein, silicone and silicone resins.

The dyestuffs which are fully methylated at the sulphonylurea or methane group are particularly suitable for dyeing polyolefine fibres such as polypropylene fibres from an aqueous or organic liquor, above all by the padding-thermo-fixing process.

In the examples which follow the parts, unless otherwise specified, denote parts by weight and the percentages denote percentages by weight.

Example 1

2.55 parts of 4-[N-ethyl-N-β-hydroxyethyl-amino]-2-methylbenzylidenemalodinitrile, 2.2 parts of p-toluene-sulphonylisocyanate and 20 parts by volume of chlorobenzene are heated for 2½ hours unde reflux. The solvent is distilled off under reduced pressure and the residue is triturated with methanol. The precipitated orange-yellow dyestuff of formula

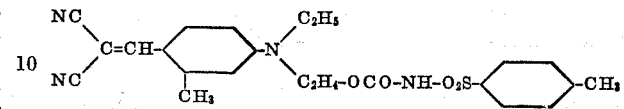

is filtered off, washed with methanol and dried. It dyes polyester fibres from boiling tetrachlorethylene to give greenish-tinged yellow shades.

Example 2

4 parts of 4 - [N,N-bis-(2'-hydroxyethyl)-amino]-2-methylbenzylidenemalodinitrile are dssolved n 100 parts by volume of hot chlorobenzene and a solution of 6.6 parts of p-toluenesulphonylisocyanate in 100 parts by volume of chlorobenzene is added dropwise. The mixture is allowed to stand overnight at room temperature. The precipitated dyestuff of formula

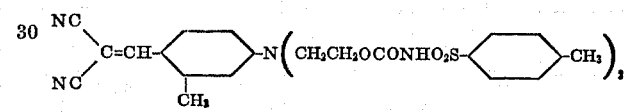

is filtered off, rinsed with a little chlorobenzene and dried. It dyes polyester fibres in boiling tetrachloroethylene to give greenish-tinged yellow shades.

Example 3

4.4 parts of 4[N - ethyl - N - 2'-(4''-methylphenylsulphonylamidocarbonyl)oxyethyl] - amino - 2 - methylbenzylidenemalodinitrile, 22.5 parts of methyl iodide, 20 parts of potassium carbonate and 100 parts by volume of methyl ethyl ketone are boiled for about 5 hours under reflux. When the starting product is no longer visible in the thin layer chromatogram, the reaction mixture is cooled and the potassium salts are filtered off. The filtrate is evaporated and the dyestuff of formula

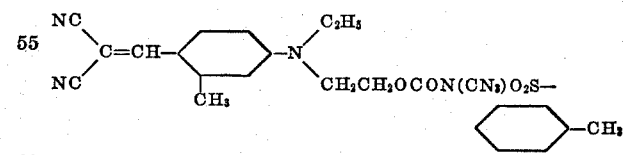

is isolated. It dyes polyester fibres from an aqueous bath to give greenish-tinged yellow shades.

The dyestuffs given in Table 1, corresponding to the formula

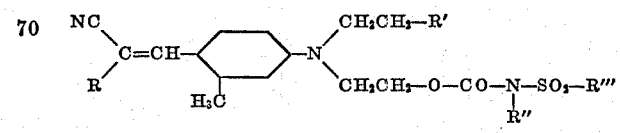

are obtained in an analogous manner.

TABLE I

| | R | R' | R'' | R''' | Shade on polyesters |
|---|---|---|---|---|---|
| 1 | —CN | —H | —C₂H₅ | ⬡—CH₃ | Greenish-tinged yellow. |
| 2 | —CN | —H | —H | —CH₃ | |
| 3 | —CN | —H | —CH₃ | —CH₃ | Yellow. |
| 4 | —CN | —OCONSO₂R'''  (R'') | —H | ⬡—CH₃ | Do. |
| 5 | —CN | Same as above | —H | ⬡—CH₃ | Do. |
| 6 | —CN | ...do... | —CH₃ | ⬡—CH₃ | Greenish-tinged yellow. |
| 7 | —CN | ...do... | —CH₃ | ⬡ | Do. |
| 8 | —CN | ...do... | —C₂H₅ | ⬡—CH₃ | Do. |
| 9 | —CN | ...do... | —H | —CH₃ | |
| 10 | —CN | ...do... | —CH₃ | —CH₃ | Do. |
| 11 | —COOC₂H₅ | —H | —H | ⬡—CH₃ | |
| 12 | —COOC₂H₅ | —H | —CH₃ | Same as above | Do. |
| 13 | —COOC₂H₅ | —H | —H | ⬡ | |
| 14 | —COOC₂H₅ | —H | —CH₃ | ⬡—Cl | Do. |
| 15 | —SO₂—⬡ | —H | —H | ⬡—CH₃ | |
| 16 | Same as above | —H | —CH₃ | Same as above | |
| 17 | ...do... | —H | —H | —CH₃ | |
| 18 | ...do... | —H | —CH₃ | —CH₃ | Do. |

What we claim is:

1. A styryl dyestuff characterized by the formula

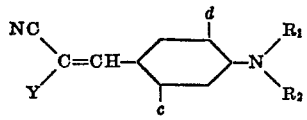

wherein
  c and d are the same or different and represent methyl, ethyl, methoxy, ethoxy, phenylthio, phenoxy, chlorine, bromine, trifluoromethyl or hydrogen;
  R₁ and R₂ are each hydrogen, unsubstituted C₁–C₄-alkyl or C₁–C₄-alkyl substituted by phenyl, chlorine, bromine, fluorine, C₁–C₄ - alkoxy, formylamino, formyloxy, C₁–C₅-alkyl-carbonylamino, C₁–C₅-alkyl-carbonyloxy, benzoyloxy, benzoylamino, C₁–C₄-alkyl-carbamoyloxy, phenylcarbamyl, C₁–C₄-alkyloxycarbonyloxy, phenoxycarbonyloxy and phenoxy, in which at least one of R₁ and R₂ contains a group of the formula —X—CO—NR—SO₂—R₃ wherein R is hydrogen, alkyl or cyclohexyl and R₃ is C₁–C₄-alkyl or cyclohexyl and X is O, S or —NR₄—, wherein R₄ is hydrogen, alkyl of from 1 to 3 carbon atoms or cyclohexyl; and
  Y is CN, —CO—O—(C₁–C₃-alkyl or phenyl),
    —SO₂—(C₆–C₈-aryl)
  and —CONR₅—R₆ wherein R₅ and R₆ may be the same or different and represent hydrogen or C₁–C₃-alkyl.

2. A dyestuff according to claim 1 of the formula

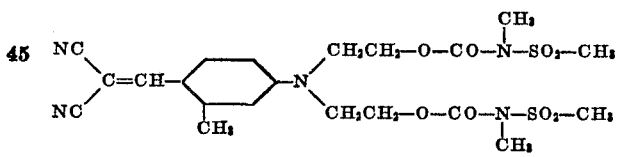

3. A dyestuff according to claim 1 of the formula

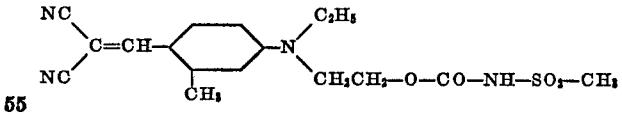

References Cited
UNITED STATES PATENTS
3,390,168   6/1968   Brack _____ 260—465

LEWIS GOTTS, Primary Examiner
D. H. TORRENCE, Assistant Examiner

U.S. Cl. X.R.
8—175; 260—152, 156, 158, 163, 165, 186, 202, 205, 206, 207, 296 R, 303, 312, 372, 397.6, 397.7, 465 E